Patented May 23, 1939

2,159,611

UNITED STATES PATENT OFFICE 2,159,611

SPRAY OIL EMULSIFIER

Arthur E. Allum, Jr., Garden Grove, Calif., assignor to Shell Development Company, San Francisco, Calif., a corporation of Delaware No Drawing. Application December 20, 1937, Serial No. 180,835

11 Claims. (Cl. 167—43)

This invention pertains to the use of spray emulsions, and particularly to those made by the "tank mix" method, i. e., the method whereby the emulsion is formed in the spray tank just prior to use with a so-called "soluble" oil.

It is one of the objects of this invention to produce an emulsifiable oil from cheap and readily obtainable substances which is capable of forming a stable emulsion with little agitation, and which has a great penetrating power. Further, the invention provides an emulsifiable composition which is non-phytocidal, and which forms an even, continuous film of oil over the plant sprayed.

The emulsifier of my invention is a by-product from the refining of fish oils, particularly whale and sardine oils. To improve their quality, these oils are subjected to an acid treatment in which they are contacted with from 1 to 2% of an aqueous sulfuric acid whose concentration is 25–80% $H_2SO_4$. The mixture is allowed to stratify into an oil layer and an acid or sludge layer, the latter containing various impurities removed from the oil, and the layers are separated. The emulsifying agent used according to my invention is derived from the separated acid sludge by a treatment which consists of neutralizing the sludge with an organic or inorganic base or an alkali, such as an aqueous solution of an alkali hydroxide, such as NaOH, $NH_4OH$, or, preferably, an alkaline earth hydroxide, such as $Ca(OH)_2$, until it separates into an oily layer and an aqueous layer. The neutralization is carried out to the point of neutralizing the mineral acidity, which is just short of the stage where an appreciable formation of soaps begins. Preferably, I use enough basic substance to neutralize only one equivalent of free mineral acidity, although smaller or greater amounts of the base may be used.

The acid sludge may be diluted with about 20–100% by volume of water prior to neutralization, which will result in partial separation of oily, substantially neutral or low-acid substances from the sludge in the form of a separate liquid phase; such separated substances may be decanted from the diluted sludge prior to the neutralization with alkali, and not combined with the more active oily substances liberated from the sludge by subsequent neutralization. However, usually, I combine both portions of the organic material contained in the sludge, either after they have been separately obtained, or by omitting the step of decanting the oily layer formed upon dilution with water. The oily product obtained by neutralization contains a considerable quantity of free acids, but otherwise its composition is uncertain; it will hereafter be referred to as high-acid fish oil. It is also possible to use high-acid fish oil obtained by the neutralization of the acid sludge which is produced by the acid refining of blown fish oils; however, a high-acid fish oil derived from natural, not blown, fish oils is preferred, its penetrating power being superior to the corresponding product from blown oils.

Representative refined, blown, and high-acid fish oils have the following characteristics:

|  | Refined fish oil | Blown fish oil | High-acid fish oil |
|---|---|---|---|
| Acid number | .10 | 8 | 64.2 |
| Saponification number | 197 | 185 | 197 |
| Specific gravity | .933 | 1.015 | .935 |
| Iodine number | 181 | 100 | 112 |
| Viscosity at 100° F. (Saybolt Universal) | 129 | 870 | 303 |

From this it can be seen that the high-acid fish oil differs considerably from the fresh and blown fish oils. It might also be mentioned that, due to only partial neutralization of the fish oil acid sludge, there is substantially no soap in the high-acid fish oil; the ash content of the latter is usually very low (less than .15% by weight), and tests indicate that the ash consists mainly of iron oxide.

The most outstanding property of my emulsifier is the great insect-killing power which it imparts to the spray oil. While I am not certain of the exact mechanism of its action, it is probable that, in addition to its surface tension-reducing effect which enables the oil to penetrate the spiracles of the insect, my emulsifier has a considerable insecticidal value of its own.

On the basis of early tests it was suspected that the high-acid fish oil might have the same characteristics as a mixture of ordinary fish oil and an acid, such as oleic. Such proved to be not the case, as the following data show. For this test 8.33 c. c. (1.66%) of spray oil and an emulsifier, as shown, were dispersed in tap water (hardness as $CaCO_3$=100 P. P. M.) for one minute, after which the mixture was passed through a homogenizer. The emulsion was then placed in a Babcock bottle and the amount of oil separating after standing for an hour and a half was noted. The percentages of low-acid fish oil (ordinary commercial fish oil) and oleic acid were chosen so that the mixture would have the same acid equivalent as the high-acid fish oil.

| Emulsifier used | Percent oil retained in emulsion |
|---|---|
| None | 30 |
| 1% (vol.) high-acid fish oil | 85 |
| .68% (vol.) low-acid fish oil <br> .32% (vol.) oleic acid | 78 |
| 1% (vol.) low-acid fish oil | 76 |

From this it can be seen that even though the low-acid fish oil is acidified to the extent of the high-acid fish oil, it is still a less-active emulsifier than the high-acid fish oil.

Although the high-acid fish oil is well suited for use with hard or soft waters, in very hard waters it is sometimes advisable to add a water softener. For this purpose I prefer trisodium phosphate, which should be added to the water before the oil, and is ordinarily of a sufficiently small quantity that no substantial amount of soap is formed on the addition of the fish oil.

However, in many applications where the presence of soap in the spray mixture is not objectionable, a basic substance, preferably an alkali hydroxide, such as sodium or potassium hydroxides may be added to neutralize a portion of the high-acid fish oil to produce a carefully regulated amount of soap. Instead of the alkali hydroxides, an organic base such as amines may be added to the high-acid fish oil to produce amino salts. The soap or salt so formed is beneficial in that it enhances the emulsifying qualities of the oil, but should not be formed in a sufficient quantity to neutralize all of the acid of the high-acid fish oil, as free acid is essential in reducing the surface tension of the finished spray oil. Generally, to secure the best results, the acid number of the high-acid fish oil should not be reduced below 20.

In practice from 1–5% of the high-acid fish oil is dissolved in plant spray mineral oil. Then from 1–10% of the compounded oil can be added to water and agitated to produce a good spraying emulsion. Suitable oils for use as plant sprays are well known to those skilled in the art. However, it might be said that these oils are highly refined, usually of mineral origin, and are high in unsulfonated residue, such as white oils. Their viscosity varies from 45 to 325 seconds (Saybolt Universal at 100° F.), and their gravity is on the order of 20 to 40 degrees A. P. I.

As mineral oil containing small concentrations of the high-acid fish oil may not be effective against some insect pests, it is sometimes desirable to add some other form of insecticide such as lead arsenate, pyrethrum, rotenone, or nicotine to the spray mixture. Such insecticides can be dissolved in the oil or water phase of the spray mixture, depending on their respective solubilities. If they are insoluble in both phases they may be finely ground and dispersed in the emulsion.

Preferably, I do not use any additional emulsifying agents with the high-acid fish oil, as its use affords ample certainty and flexibility in preparing a soluble oil. However, the use of additional emulsifiers is not excluded when the simplicity of preparing the soluble oil is not important.

In use this emulsion is found to provide a continuous, even film of oil over the surface sprayed. This, combined with its greater penetrating and killing power for the insects, makes it a very useful plant spray.

In regard to the conditions of sulfuric acid treating fish oils to remove rancidity and sludge-forming substances, these conditions are well known in the art. The treatment is usually carried out at a room or somewhat elevated temperature and apparently results in chemical reactions between the acid and various impurities, such as mucilaginous material of the type of lecithin or unsaturated substances, as well as the physical extraction of small amounts of neutral oil; under these conditions sulfation of olefinic bonds or hydroxy groups may take place to a limited extent, while the sulfonation of oil is substantially or entirely avoided.

I claim as my invention:

1. An emulsifiable hydrocarbon spray oil composition comprising a normally liquid plant spray mineral oil, and an emulsifying amount of a high-acid fish oil obtained from the acid sludge from the sulfuric acid refining of fish oils by neutralizing the sludge with an alkali to separate the said high-acid fish oil from the sludge.

2. The spray oil composition of claim 1 containing a small amount of soap.

3. A soap-free emulsifiable hydrocarbon spray oil composition comprising a normally liquid plant spray mineral oil, and an emulsifying amount of a high-acid fish oil obtained from the acid sludge from the sulfuric acid refining of fish oils by neutralizing the sludge with an alkali to separate the said high-acid fish oil from the sludge substantially without forming a soap in the high-acid fish oil.

4. An emulsifiable hydrocarbon spray oil composition consisting of a normally liquid plant spray mineral oil and an emulsifying amount of high-acid fish oil obtained from the acid sludge from the sulfuric acid refining of fish oils by neutralizing the sludge with an alkali to separate the said high-acid fish oil from the sludge as sole emulsifier.

5. An emulsifiable hydrocarbon spray oil composition comprising a normally liquid plant spray mineral oil, and an emulsifying amount of high-acid fish oil obtained from the acid sludge from the sulfuric acid refining of fish oils by neutralizing the sludge with an alkali to separate the said high-acid fish oil from the sludge in which the oil is separated from the acid sludge by neutralization with $Ca(OH)_2$.

6. An emulsion suitable for use as an insecticidal spray comprising plant spray mineral oil, water, and an emulsifying amount of high-acid fish oil obtained from the acid sludge from the sulfuric acid refining of fish oils by neutralizing the sludge with an alkali to separate the said high-acid fish oil from the sludge.

7. An emulsion suitable for use as an insecticidal spray comprising plant spray mineral oil, an emulsifying amount of high-acid fish oil obtained from the acid sludge from the sulfuric acid refining of fish oils by neutralizing the sludge with an alkali to separate the said high-acid fish oil from the sludge and water to which a suitable water-softener has been added, the quantity of water softener being insufficient to form a substantial amount of soap with the high-acid fish oil.

8. An emulsifiable hydrocarbon spray oil composition comprising a normally liquid plant spray mineral oil, and an emulsifying amount of a high-acid fish oil obtained from the acid sludge from the sulfuric acid refining of blown fish oils by neutralizing the sludge with an alkali to separate the said high-acid fish oil from the sludge.

9. An emulsifiable hydrocarbon spray oil composition comprising a normally liquid plant spray mineral oil, an active insecticide, and an emulsifying amount of a high-acid fish oil obtained from the acid sludge from the sulfuric acid refining of fish oils by neutralizing the sludge with an alkali to separate the said high-acid fish oil from the sludge.

10. An emulsifiable hydrocarbon spray oil composition comprising a normally liquid plant spray mineral oil, and an emulsifying amount of a high-acid fish oil obtained from the acid sludge from the sulfuric acid refining of fish oils by neutralizing the sludge with a base to separate the said high-acid fish oil from the sludge.

11. An emulsifiable hydrocarbon spray oil composition comprising a normally liquid plant spray mineral oil, and an emulsifying amount of a high-acid fish oil obtained from the acid sludge from the sulfuric acid refining of fish oils by neutralizing the sludge with an organic base to separate the said high-acid fish oil from the sludge.

ARTHUR E. ALLUM, Jr.